F. P. McCOLL AND W. W. WILLISON.
METHOD OF CANNING SHREDDED COCOANUT AND ARTICLE.
APPLICATION FILED JAN. 31, 1918.

1,330,597.

Patented Feb. 10, 1920.

INVENTORS
Francis P. McColl
Walter W. Willison
BY
Alan M. Johnson
ATTORNEY

UNITED STATES PATENT OFFICE.

FRANCIS P. McCOLL, OF RIDGEWOOD, NEW JERSEY, AND WALTER WILLIAM WILLISON, OF NEW YORK, N. Y., ASSIGNORS TO THERMOKEPT PRODUCTS CORPORATION, OF NEW YORK, N. Y., A CORPORATION OF MAINE.

METHOD OF CANNING SHREDDED COCOANUT AND ARTICLE.

1,330,597.     Specification of Letters Patent.     Patented Feb. 10, 1920.

Application filed January 31, 1918. Serial No. 214,621.

*To all whom it may concern:*

Be it known that we, FRANCIS P. McCOLL, a citizen of Canada, and a resident of Ridgewood, in the county of Bergen and State of New Jersey, and WALTER WILLIAM WILLISON, a citizen of the United States, and a resident of New York, in the county of New York and State of New York, have jointly invented a certain new and useful Method of Canning Shredded Cocoanut and Article, of which the following is a specification.

Our invention relates to preserving and canning shredded cocoanut.

Under the present practice the cocoanut is shredded, mixed with the required quantity of sugar, and a certain quantity of glycerin is added to insure that the shredded cocoanut will be soft when it is removed from the can.

Then, in order to keep it from spoiling, it is necessary to dry the mass down so that there is quite a low percentage of water, usually about 5 per cent.

This procedure is not only expensive, in that it requires the addition of glycerin or some similar agent, but it drives off such a large percentage of the natural milk of the cocoanut that the original and delicate taste of the cocoanut is largely destroyed and its bulk is reduced.

By our invention we greatly improve the product and obtain it at less cost than under the old process above referred to. We obtain an article that has more natural cocoanut milk than any shredded cocoanut on the market and has the perfect taste of fresh cocoanut.

By our method we shred the cocoanut in the usual manner and while it is still moist with its natural milk we mix the required quantity of sugar with it.

We then dry the mixture of shredded cocoanut and sugar until the percentage of water retained is such that the shredded cocoanut can be sealed *in vacuo* without being processed. The percentage of water retained will vary. Usually it will be from 7 per cent. to 20 per cent., preferably about 12 per cent. It is to be distinctly understood, however, that our invention is not to be limited to these particular percentages, for by our process it is simply necessary to retain in the shredded cocoanut sufficient of the natural milk of the cocoanut to give the canned cocoanut the required softness which is now obtained by adding some other element as, for example, glycerin. A necessary result of this is to greatly enhance the taste of our shredded cocoanut, making it substantially the same as fresh cocoanut, for we retain a larger percentage of the natural milk of the cocoanut.

We then place the partially dried mixture of shredded cocoanut and sugar in containers or cans and subject them to a vacuum, preferably a high one, so as to withdraw the occluded air from the shredded cocoanut, and then seal the cocoanut in the containers.

This canning is preferably done in a vacuum canning machine, now well known in the trade, the contents of the cans being preferably subjected to a vacuum of about 28 inches or higher.

Of course various forms of apparatus and containers may be used to carry out our process.

In the accompanying drawing we have shown one type of container which may be used with our method. In the drawings the same reference numerals refer to the similar parts in the several figures.

Figure 1:
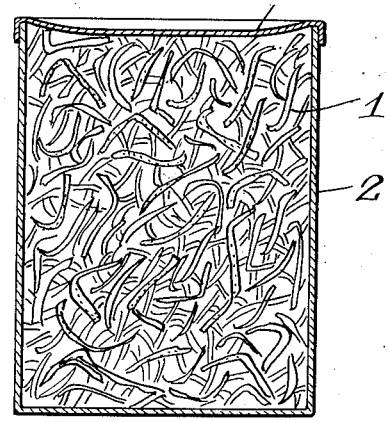
Figure 1 is a vertical section through a container showing our shredded cocoanut therein.
Figure 2:
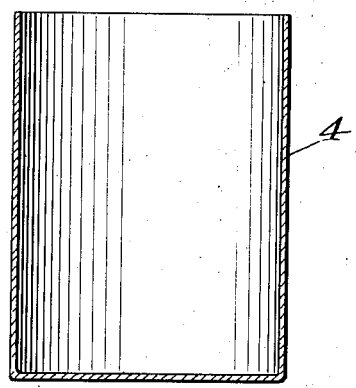
Fig. 2 is a vertical section through an inner carton which may or may not be used.
Figure 4:
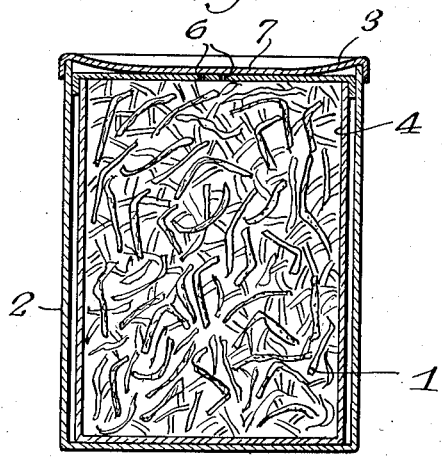
Fig. 4 is a vertical section through a can containing an inner carton in which the cocoanut may be packed.
Figure 3:
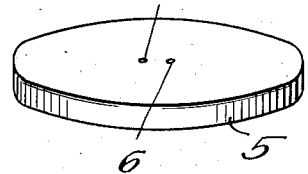
Fig. 3 is a perspective view of the cap of the carton.

In these drawings the shredded cocoanut 1, after being mixed with the required quantity of sugar and dried until the percentage of moisture retained is such that the shredded cocoanut can be sealed *in vacuo* without being processed, is placed in the container 2, which is preferably a tin can. It is, of course, to be understood that if desired the shredded cocoanut may be first placed in the cans 2 and dried in the cans to the required degree, though we preferably dry the cocoanut before placing it in the can 2. This can 2 with its contained shredded cocoanut is then fed into a vacuum canning machine (not shown) which subjects the contents of the can to a vacuum sufficiently high to withdraw the occluded air from the shredded cocoanut, and then seals the cap 3 upon the can after of course, exhausting all the air from the can. The shredded cocoanut so treated and canned need not be processed.

To obtain the best results we preferably use a vacuum of 28 inches or higher.

In some cases we may use an inner non-metallic container or carton 4 having a non-metallic cover 5 with holes 6, 6 therein. The shredded cocoanut is placed in the carton 4, which is usually of paper, the cover 5 is then placed upon the carton, and the entire carton is then placed in the metal can 2. It is then fed to a vacuum canning machine (not shown) which exhausts all the air from the can 2 as well as from the carton 4 and the occluded air from the shredded cocoanut, the air passing out through the holes 6, 6 in the cover 5. The center of the metal cover 3 originally is slightly convex. After passing through the vacuum canning machine and being again subjected to atmospheric pressure, this atmospheric pressure will dish the portion 7 of the cover 3 and close the openings 6, 6, as well as put sufficient pressure upon the inner carton to prevent rattling or shaking of the carton within the tin can 2.

Having thus described our invention to the details of which we do not desire to be limited, what is claimed as new and what is desired to secure by Letters Patent is set forth in the appended claims:

1. The process of preserving cocoanut which consists in shredding the cocoanut while in its natural state, mixing the moist, shredded cocoanut with sugar, drying to drive off part only of the water content of the mixture to leave the mixture in a soft condition, vacuumizing the mixture and finally sealing in vacuum.

2. The process of preserving cocoanut in a moist condition which consists in shredding the cocoanut while in its natural state, mixing the moist, shredded cocoanut with sugar, drying the mixture until the percentage of water retained is about twelve per cent. (12%), vacuumizing the mixture, and finally sealing in vacuum.

3. As a new article of manufacture, a sealed container exhausted of air containing a moist mixture of shredded or comminuted cocoanut, mixed with sugar and freed of occluded air, the water content of which mixture is about 12 per cent. (12%) of its original content.

FRANCIS P. McCOLL.
WALTER WILLIAM WILLISON.

Witnesses:
 CHRYSTINE GLASER,
 JAMES F. KELLY.